United States Patent
Wang et al.

(10) Patent No.: US 11,288,783 B2
(45) Date of Patent: *Mar. 29, 2022

(54) METHOD AND SYSTEM FOR IMAGE ENHANCEMENT

(71) Applicant: CHONGQING UNIVERSITY OF POSTS AND TELECOMMUNICATIONS, Chongqing (CN)

(72) Inventors: Guoyin Wang, Chongqing (CN); Tong Zhao, Chongqing (CN); Bin Xiao, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/796,998

(22) Filed: Feb. 21, 2020

(65) Prior Publication Data
US 2020/0193578 A1    Jun. 18, 2020

Related U.S. Application Data

(63) Continuation of application No. 15/566,222, filed as application No. PCT/CN2015/076567 on Apr. 14, 2015, now Pat. No. 10,580,122.

(51) Int. Cl.
*G06T 5/40* (2006.01)
*G06T 5/00* (2006.01)
(Continued)

(52) U.S. Cl.
CPC .............. *G06T 5/40* (2013.01); *G06T 5/009* (2013.01); *G06T 5/10* (2013.01); *G06T 5/50* (2013.01);
(Continued)

(58) Field of Classification Search
CPC .... G06T 5/40; G06T 5/50; G06T 5/10; G06T 5/009; G06T 2207/30168;
(Continued)

(56) References Cited

U.S. PATENT DOCUMENTS 5,317,689 A * 5/1994 Nack ............... G06T 15/06
                                                 345/505
6,463,173 B1 * 10/2002 Tretter ............. G06T 5/009
                                                 382/162
(Continued)

FOREIGN PATENT DOCUMENTS

CN        102547117      7/2012
EP          1443460      8/2004

OTHER PUBLICATIONS

Zhang Yanling et al., Image Enhancement of Lymph Node Based on Cloud-Model Clustering, Journal of Guangzhou University(Natural Science Edition), 12(2), 2013.

(Continued)

*Primary Examiner* — Bobbak Safaipour
(74) *Attorney, Agent, or Firm* — Metis IP LLC

(57) ABSTRACT

A method for image processing, which comprises the following steps: Generating a first histogram from a first image; Calculating a first parameter profile from the first image indicative of the quality of the first image; Adjusting the first parameter profile to generate a second parameter profile; Using the second parameter profile to generate a statistical distribution via a statistical distribution generator, wherein the statistical distribution is characterized by at least three parameters; Using the statistical distribution to perform a histogram specification to the first histogram of the first image to generate a second histogram; Generating a second image based on the first image and the second histogram.

18 Claims, 8 Drawing Sheets

(51) Int. Cl.
*H04N 1/60* (2006.01)
*G06T 5/50* (2006.01)
*G06T 5/10* (2006.01)

(52) U.S. Cl.
CPC . *H04N 1/6005* (2013.01); *G06T 2207/10024* (2013.01); *G06T 2207/20076* (2013.01); *G06T 2207/30168* (2013.01)

(58) Field of Classification Search
CPC G06T 2207/20076; G06T 2207/10024; H04N 1/6005
See application file for complete search history.

(56) References Cited

U.S. PATENT DOCUMENTS

| | | | | |
|---|---|---|---|---|
| 8,942,995 | B1* | 1/2015 | Kerr | G07C 9/00 |
| | | | | 705/14.67 |
| 9,934,094 | B2* | 4/2018 | Taranta | G06F 11/2289 |
| 10,481,872 | B2* | 11/2019 | Jaroch | G06F 7/58 |
| 2004/0047494 | A1 | 3/2004 | Lee et al. | |
| 2005/0069207 | A1 | 3/2005 | Zakrzewski et al. | |
| 2005/0207630 | A1 | 9/2005 | Chan et al. | |
| 2010/0278423 | A1 | 11/2010 | Itoh et al. | |
| 2012/0140250 | A1* | 6/2012 | Ichihashi | H04N 1/4051 |
| | | | | 358/1.2 |
| 2013/0293532 | A1* | 11/2013 | Vaddadi | G06T 15/005 |
| | | | | 345/419 |
| 2014/0086495 | A1* | 3/2014 | Hao | G06K 9/00664 |
| | | | | 382/218 |
| 2015/0278659 | A1* | 10/2015 | Yano | G06K 15/1843 |
| | | | | 358/1.9 |
| 2016/0191336 | A1* | 6/2016 | Zhang | H04L 41/16 |
| | | | | 709/224 |
| 2016/0213353 | A1* | 7/2016 | Masui | A61B 8/461 |
| 2016/0260203 | A1* | 9/2016 | He | G06T 5/007 |
| 2018/0300108 | A1* | 10/2018 | Goldman | H04L 67/10 |
| 2021/0200880 | A1* | 7/2021 | Khosravi | H04L 9/0894 |

OTHER PUBLICATIONS

International Search Report in PCT/CN2015/076567 dated Jan. 13, 2016, 4 pages.
Written Opinion in PCT/CN2015/076567 dated Jan. 13, 2016, 4 pages.

* cited by examiner

Ex=201, En=18, He=3        Ex=201, En=122, He=3

Ex=185, En=9, He=3        Ex=185, En=63, He=3

METHOD AND SYSTEM FOR IMAGE ENHANCEMENT

CROSS-REFERENCE TO RELATED APPLICATIONS

This application is a continuation application of U.S. patent application Ser. No. 15/566,222, filed on Oct. 13, 2017, which is U.S. national stage entry under 35 U.S.C. § 371 of International Application No. PCT/CN2015/076567, filed on Apr. 14, 2015. The contents of above applications are hereby incorporated by reference.

FIELD OF THE INVENTION

The invention relates to an image processing method and system, particularly relates to an image enhancement method and system, more particularly to a contrast enhancement method and system.

BACKGROUND OF THE INVENTION

Image enhancement is a subfield in digital image processing which aims to improve the interpretability or perception of information in images for human viewers, or to provide better input for other automated image processing techniques.

Generally speaking, image enhancement approaches fall into two broad categories: spatial domain methods and frequency domain methods. While frequency domain methods are carried out on the frequency domain of an image, spatial domain methods operate directly on pixels of an image. Among all the methods, histogram equalization and histogram specification both belong to the category of spatial domain techniques and offer effective approaches in image enhancement.

To adjust the contrast of an image, histogram equalization is often implemented. Roughly speaking, an image histogram is a type of histogram that acts as a graphical representation of the tonal distribution in a digital image. The histogram plots the number of pixels in the image (vertical axis) with a particular brightness value (horizontal axis). Histogram equalization spreads out the most frequent intensity values. After equalization, the gray level in object image is set to be uniformly distributed.

Different from histogram equalization which makes the gray level in the object image uniform, histogram specification (or histogram matching) offers another flexible and efficient way of image enhancement. The process of histogram specification takes in an input image and produces an output image that is based upon a particular histogram that can be pre-defined. The histogram specification can be degraded into histogram equalization if the gray level in the object image is set to be uniformly distributed.

Since the process of histogram specification depends on the histogram that is specifically defined, it is essential for histogram specification to choose a suitable shape of the histogram, i.e., to choose a density function of the histogram. Several methods of histogram specification so far have been used to improve the performance of histogram specification. For example, some proposals are formulated utilizing a single Gaussian function having the average grey level value of the input image as the expectation and the contrast value as the standard deviation to specify a histogram. Unfortunately, those proposals utilizing a single Gaussian function suffer from loss of image details.

It would therefore be desirable to have systems and methods that implement a histogram specification to improve the reproduction of image detail while enhancing the quality of an image effectively.

SUMMARY OF THE INVENTION

It is an object of the present invention to provide an image processing method utilizing a statistical distribution to enhance a digital image.

It is an object of the present invention to provide an image processing method capable of enhancing the clarity or contrast of an image without losing its detail.

It is an object of the present invention to provide an image processing method capable of enhancing the visual effect of a digital image.

According to another aspect of the present invention, the contrast of the image is utilized as an input value to generate the statistical distribution model.

In one embodiment of the present invention, an image processing method comprises of, first, reading an image and generate a histogram thereof; then, calculating a parameter profile from the image; adjusting the parameter profile to get a new parameter profile; using the new parameter profile as input to a cloud generator to generate a statistical distribution; using the distribution function to perform histogram specification to the said histogram; and lastly, generating a new image and a corresponding histogram thereof.

Further features and aspects of the present invention will become apparent from the following detailed description of exemplary embodiments with reference to the attached drawings.

DETAILED DESCRIPTION

The invention will now be described by way of example with reference to the accompanying drawings.

Optional Preprocessing

To process an image, especially when the image is a color image, several preprocessing steps may be carried out.

The color conversion, or sometimes called color transformation, is usually included in the preprocessing steps.

Conventional image capturing or acquisition devices often utilize one specific kind of various RGB color spaces (Adobe RGB, sRGB, ProPhoto RGB, etc.) to acquire a color image. Similarly, images are usually stored in the same RGB color space. The RGB format labels the different colors according to the human vision system and expresses a color image in terms of Red (R), Green (G) and Blue (B) components. On the other hand, the luminance information, rather than the color information, is paid more attention in many applications. Therefore, alternative color spaces including YUV color spaces (YUV PAL, YDbDr SECAM, YCbCr, YPbPr, xvYCC, etc.) and YIQ color space are proposed. Since human vision is more sensitive to brightness than to color, those color spaces explicitly address the luminance information of an image. For example, YUV color spaces express a color image with one luminance component Y and two chrominance components U and V.

Accordingly, it is convenient to convert the RGB color space of an image to a different color space, such as a YUV color space, or a grayscale color space. The way of converting a color image to YUV or grayscale color space is not unique; depending on different weighting of the color channels. It can be conducted in various ways, e.g. colorimetric (luminance-preserving) conversion, which are known by a person skilled in the art.

The steps of image preprocessing are not restricted to color conversion exclusively. Other techniques in image processing such as image cropping, white-balance calibration, noise reduction, shake reduction or any other operations, as known by a person skilled in the art, may also be included. The preprocessing techniques aiming at different purposes may be executed individually or in combination.

General Procedure

To implement the image processing operations, an image processing device is described in the following to handle the relevant steps and procedures. The device may comprise a computing unit, an input unit, an image enhancement module to carry out enhancement operations, several memories to store data and buffers to store intermediate data stream, etc.

Figure 1:
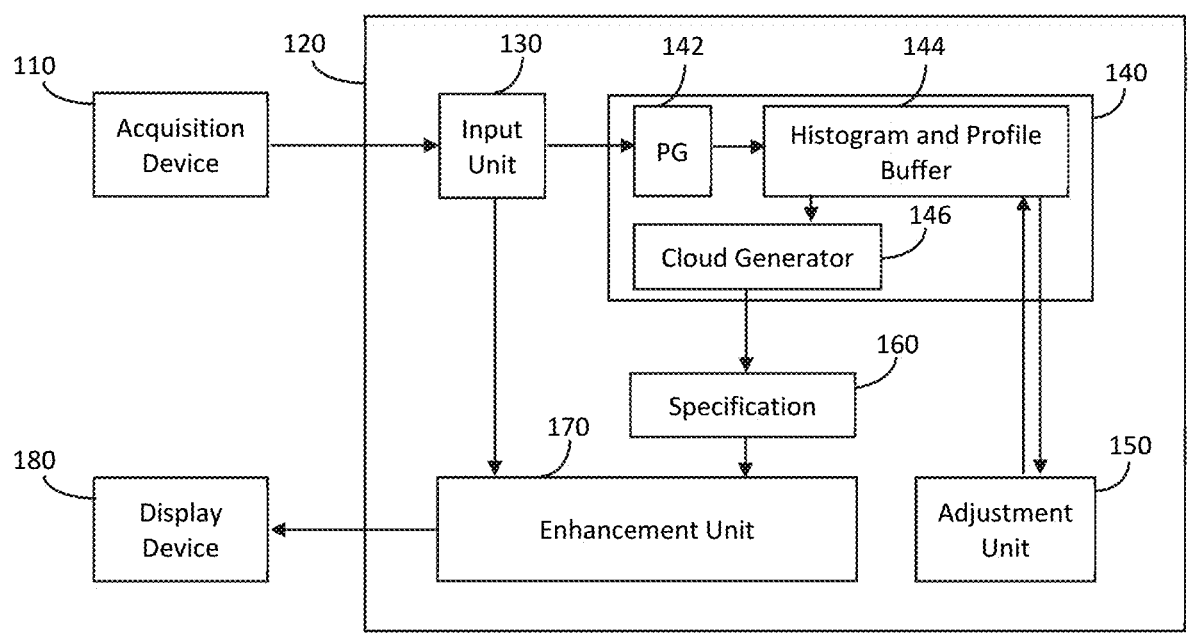
FIG. 1 is a sketch illustrating an image processing device for image enhancement.

Referring to FIG. 1, a system 120 for image enhancement is illustrated with its upstream device, say an image acquisition device 110, and the downstream device such as an image display device 180. The system comprises several modules for execution of the following functions. As an example, the image enhancement system 120 is connected to the image acquisition device 110 including but not limiting to a camera, a scanner or a mobile device with a build-in camera, and the image display device, such as a desktop display or a display of mobile phones. The manner of connection may be physical, such as via universal serial bus (USB) or an ultra-high speed (UHS) bus, or nonphysical, such as a wireless connection via wireless local area network (WLAN) or near field communication (NFC) or Bluetooth. The connection would enable data transfer between the image enhancement system and its upstream or downstream partner. Inside the system 120, an input unit 130 is deployed for reception and storage of an image file from the acquisition device 110. A computing unit 140, which receives the image data (pixel values of the image) from the input unit, calculates a histogram and a parameter profile which is used to generate a statistic distribution via a profile generator (PG) 142. The profile is then stored in a profile buffer 144, conventionally a high speed cache. Image information, such as the pixel values for a YUV image, is used by a cloud generator 146 to generate a statistical distribution. The detailed description of the generation of the statistical distribution via the cloud generator 146 is given in the following embodiment. An adjustment unit 150 is used by the system 120 to adjust the parameter profile and feed it back to the profile buffer 144 in the computing unit for updating of the parameter profile and subsequent calculation of a new statistical distribution. The adjustment unit may be tuned manually or automatically. Further, the system 120 includes a specification unit 160, which performs histogram specification according to the statistical distribution fed by the cloud generator 146. Specifically, the histogram specification maps a histogram of the original image to a new histogram using a mapping rule. With the mapping rule chosen, an enhancement unit 170 reads the original image from the input unit 130 and carries out the operation of image enhancement through the process of pixel manipulation according to the mapping rule defined by the histogram specification unit 160. The operation ends with a resulting enhanced image. Optionally, the newly generated image is outputted, for example, to a display device 180, e.g., a desktop display.

Figure 2:
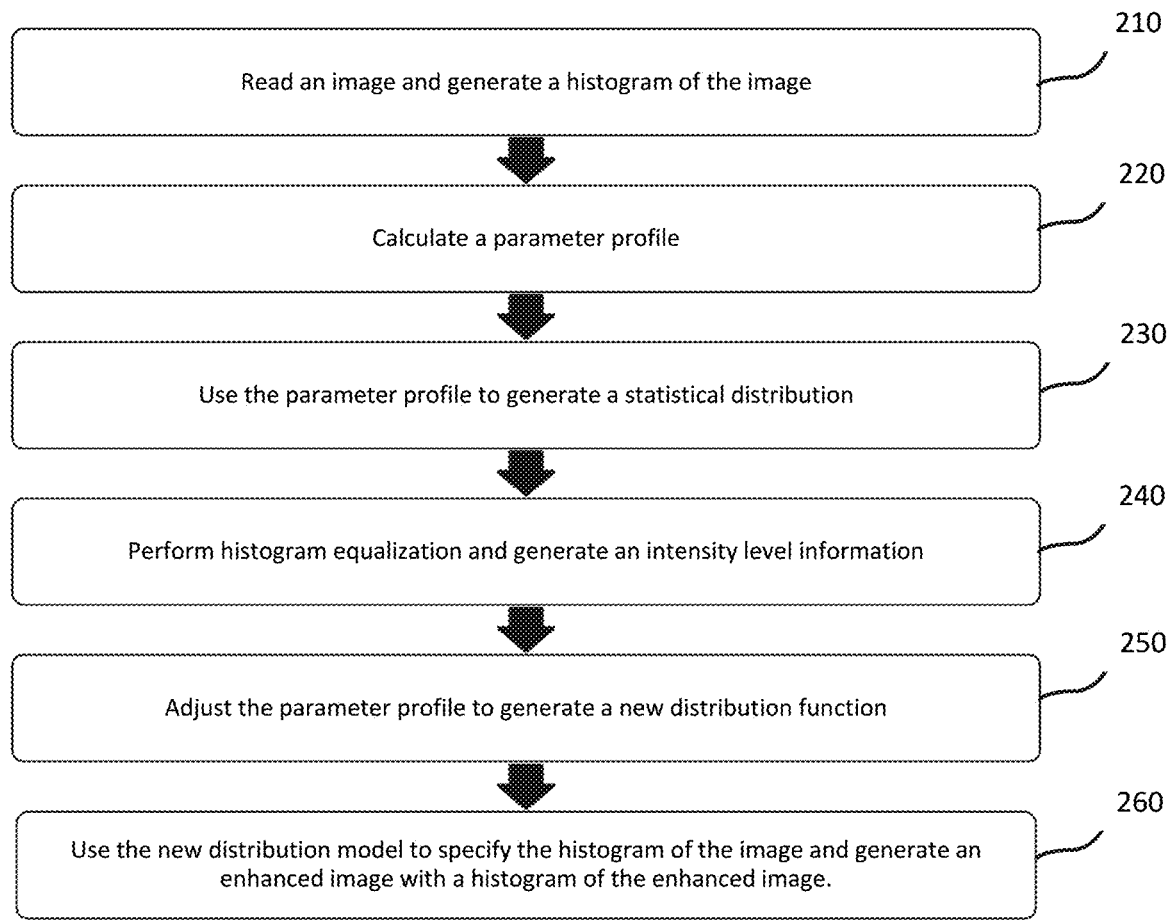
FIG. 2 is a flowchart illustrating operation of an image enhancement method for unclear image.

Referring to FIG. 2, a general workflow of image enhancement system 120 is illustrated. In step 210, initially a digital image is transferred into the image enhancement system 120, via the Internet or other physical connection such as a universal serial bus (USB) or an ultra-high speed (UHS) bus. The image enhancement system 120 has an input 130 which plays the role of both interface of the transfer and memory which stores the image. After reading the image, intensity information (RGB values in a RGB format image, Y-component values in a YUV format image, or grey level values in a grayscale image, etc.) for each pixel is stored by the input unit 130, allowing its computing unit 140 to generate a histogram which is subsequently stored in the main memory.

Going to step 220, a profile generator 142 in the system 120 calculates a parameter profile according to the stored intensity information. The parameter profile may vary according to the way of encoding, data format or type of image. Preferably, a parameter which indicates the average luminance or brightness may be included. It may be calculated as:

$$A = \sum_{r=0}^{L-1} r p_r(r) = \sum_{r=0}^{L-1} r \frac{n_r}{n}$$

Where L represents the total number of gray levels in the image (typically 256); r represents the discrete intensity level, e.g., r is an integer between 0 and 255 in a grayscale image; $n_r$ represents the occurrence of intensity level r; and n represents the total number of pixels in the image.

The contrast of the image may also be included in the parameter profile. According to a definition, the contrast of an image may be defined as $$B = \sum_{\delta=0}^{L} \delta^2 p_\delta$$

Where $\delta$ is the difference in the intensity level between neighboring pixels, and $p_\delta$ is the probability distribution of the intensity difference $\delta$ among neighboring pixels in the image.

It should be noted that several definitions of contrast are currently in use, for example, luminance contrast, Weber contrast, Michelson contrast, or root mean square (RMS) contrast. It would be customary for a person of ordinary skill in the art to adopt a different definition of contrast in the parameter profile without much creative work of him/herself.

Other parameters such as the standard deviation of the intensity values may also be included in the profile.

Going to step 230, the parameter profile obtained in step 220 is transferred to a distribution generator named a cloud generator. The cloud generator may comprise several random number generators (RNGs) that generate random variables with Gaussian distribution and multiple buffers to store the intermediate random values generated by the RNGs.

Generally speaking, a Gaussian distribution, or a normal distribution, is a mapping of two parameters, i.e., expectation and standard deviation to a normal distribution, which may agree well with the behavior of real-valued random variables whose distributions are not known. However, some random variables do not follow the Gaussian pattern, and treating them as Gaussian random variables causes systematic errors in some cases. In a cloud generator, it is possible to measure the deviation of a random phenomenon from a normal distribution when the random phenomenon does not satisfy strictly a normal distribution. Different from the Gaussian model, the cloud generator contains a random variable that describes a normally distributed standard deviation, which adds a third parameter named "hyper entropy" other than expectation and standard deviation. Thus, cloud generators use three numerical characteristics, namely Ex (expectation), En (entropy) and He (hyper entropy), wherein, Ex is most representative of a set of data; En is used to figure out the granularity scale of the set; He is used to depict the uncertainty of the granularity of the data set. The addition of additional parameters contributes to a better depiction of the data set.

Figure 3:
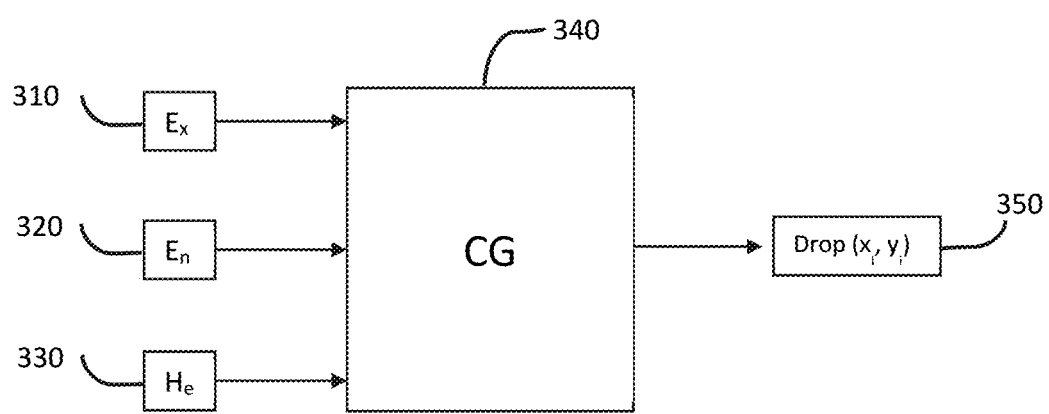
FIG. 3 is a diagram illustrating input and output of a cloud generator.
Figure 4:
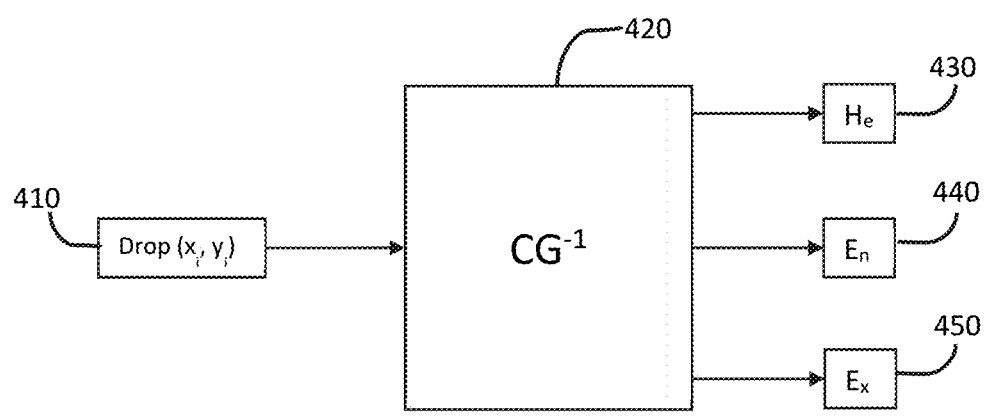
FIG. 4 is a diagram illustrating input and output of an inverse cloud generator.

Referring to FIG. 3, a cloud generator 340 maps three parameters, namely, expectation Ex, entropy $E_n$ and hyper entropy $H_e$, to a statistical distribution, as follows:

A normally distributed random number $y_i$ with expectation $E_n$ and variance $H_E$ is generated by a Gaussian random number generator, then $y_i$ is stored in a buffer;

$$y_i = R_N(E_n, H_E)$$

A normally distributed random number $x_i$ with expectation $E_x$ and variance $y_i$ is generated by the Gaussian random number generator;

$$x_i = R_N(E_x, y_i)$$

Wherein i is the index of repetition. Then the cloud generator produces plural samples, herein denoted as drop 350. The three parameters may be selected from the above parameter profile, which comprises the expectation of the grey levels (average grey level) in the grayscale version of an image, the contrast of the image, or other available information relating to the image.

Referring back to FIG. 2. In Step 240, a histogram equalization operation is carried out on the image and the histogram equalization mapping is obtained. For each intensity level k, there is an accumulative probability $s_k$ which indicates the probability of the intensity level no greater than k.

$$s_k = T(r_k) = \sum_{i=0}^{k} p_x(i) (k = 0 \sim L - 1)$$

Then, in Step 250, the parameter profile is adjusted by an adjustment unit in connection with the profile generator. It's noteworthy that at least one parameter in the profile may be changed, in a manual or automatic way. The adjustment may be carried out once, if the resulting image is satisfactory, or conducted multiply. When the adjustment is multiply conducted, it's possible to implement an iterative algorithm based on some standard iteration method, including but not limited to Newton's method, or a conjugate gradient method or a gradient descent method, or any other optimization methods known by person skilled in the art. After the adjustment a newly updated parameter profile is fed to the cloud generator to generate a new distribution function. Its probability density function can also be found, thus the probability $p_z(i)$ for each individual grey level i can be determined along with the accumulative probability $v_l$.

$$v_l = G(z_l) = \sum_{i=0}^{l} p_z(i)$$

Different ways to adjust the profile may be used, e.g., adjust only one parameter while fixing other parameters, or adjust several parameters at the same time. In a real-life scenario, it is customary to adjust the contrast of the image to enhance the perception while keeping other parameters such as the average luminance or the hyper entropy constant. It should be recognized that this step may be carried out before the step in which the histogram equalization is executed. Certain codes or algorithms may be embedded into the adjustment unit.

After the new distribution function is generated, the computing device uses this distribution function to specify the histogram of the desired image. To specify the histogram, a correlation of the source histogram and the resulting histogram is in need. Every intensity level in the source histogram is mapped to its corresponding intensity level in the resulting histogram. Said mapping may be carried out by computers or other computing devices iteratively. For each intensity level k in the original histogram, a lookup table is built to map that level to an intensity level l in the desired histogram that best matches the following equation.

$$|s_k - v_l| = \min_l \left| \sum_{i=0}^{k} p_x(i) - \sum_{j=0}^{l} p_z(j) \right| (k, l = 0 \sim L - 1)$$

After finding the intensity level l for every given intensity level k in the original histogram, a correlation which maps k to l is derived. It may be stored in a specific or standalone memory to facilitate the succeeding operations. The image processing device uses the correlation to process the histogram of the original image to get a new histogram.

In Step 260, as the result of the newly generated histogram, an enhanced image is obtained based on the original image and the new histogram by a separate module called image enhancement unit. In an iterative manner, by a computing component in the image enhancement unit, the pixels having intensity level k are mapped to new pixels having intensity l accordingly, wherein the rule of mapping is described in the preceding paragraph. After each pixel of the image is processed, an enhanced image is generated and may be stored in the main memory for storage and potential operation in the future. Therefore, the whole image is transformed and the enhancement is completed.

Exemplary Embodiment 1

Figure 5:
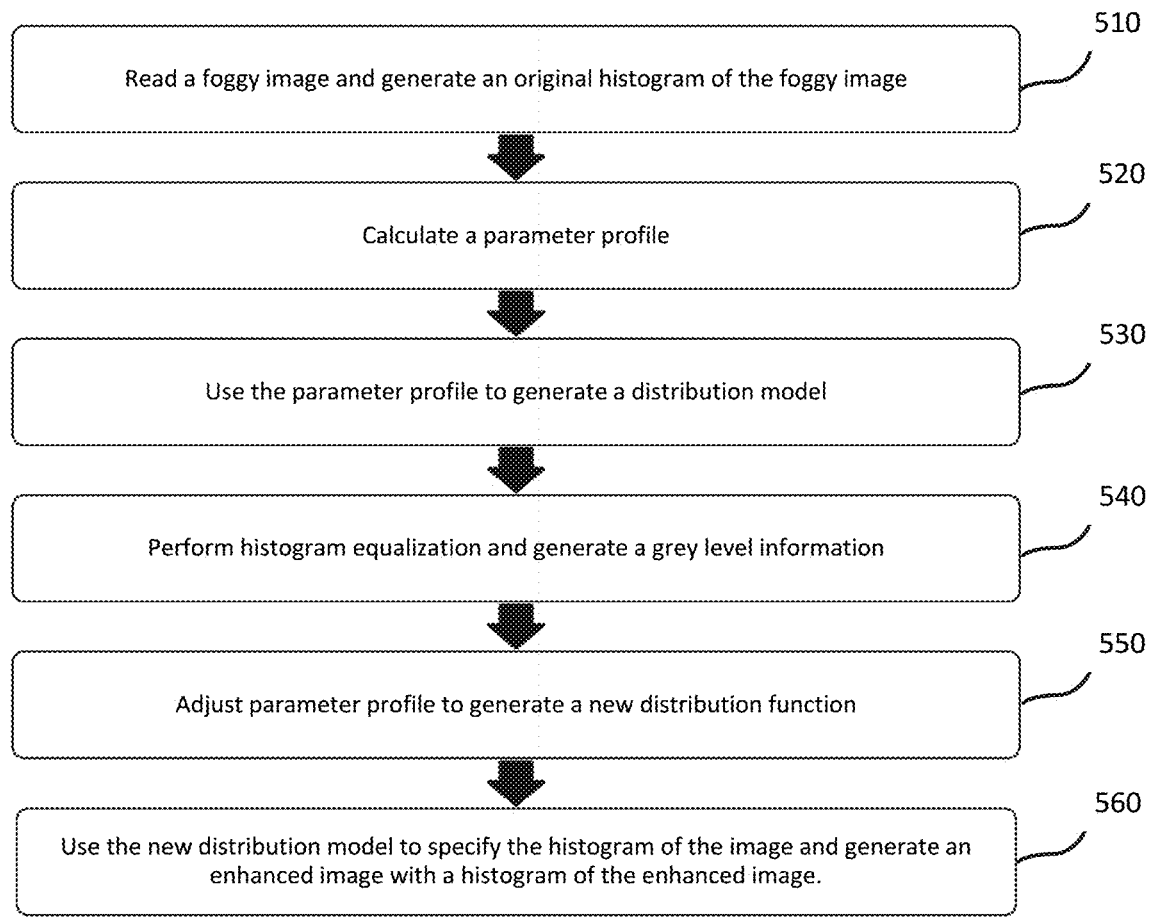
FIG. 5 is a flowchart illustrating operation of an image enhancement method for a foggy grayscale image according to one embodiment.

In this embodiment, an original grayscale image is subject to image enhancement. Herein, the image enhancement is operated on the grey level. Refer to FIG. 5. A general process in this embodiment of the invention is shown as following:
1. As 510 indicates, an original foggy image is inputted into an image processing device, the grey level value for each pixel is stored in an input unit, allowing a histogram of the original image being generated;
2. In Step 520, A parameter profile comprising three initial parameters, A, B, C, is calculated, according to the following equations:

$$A = \sum_{r=0}^{L-1} r p_r(r) = \sum_{r=0}^{L-1} r \frac{n_r}{n}$$

$$B = \sum_{\delta=0}^{L} \delta^2 p_\delta(x, y)$$

$$C = \sqrt{A^2 - B^2}$$

Where $\delta$ is the difference in the intensity level between neighboring pixels, and $p_\delta$ is the probability distribution of the intensity difference $\delta$.

3. In Step 530, the three parameters A, B, C, as the expectation ($E_x$), entropy ($E_n$), hyper entropy ($H_E$), respectively, is used by the image processing device to generate a distribution function;
   a. A normally distributed random number $y_i$ with expectation $E_n$ and variance $H_E$ is generated by a random number generator, then $y_i$ is stored in a buffer;

$$y_i = R_N(E_n, H_E)$$

b. A normally distributed random number $x_i$ with expectation $E_x$ and variance $y_i$ stored in the buffer is generated by the random number generator;

$$x_i = R_N(E_x, y_i)$$

c. Repeat Steps a and b until n cloud drops are generated.
4. The histogram of the original image is equalized using the following equation and the correlation between $s_k$ and $r_k$ is derived in Step 540:

$$s_k = T(r_k) = \sum_{r=0}^{k} p_r(r) = \sum_{r=0}^{k} \frac{n_r}{n} (r, k = 0 \sim L-1)$$

5. The values of the three parameter A, B and C, is changed, automatically or manually, and a new cloud, i.e., a new probability distribution function (PDF) is generated in Step 550;
6. In Step 560, the new PDF is used by the computing unit to specify the histogram of the original image and a new histogram is generated. Then at last, a second image is produced according to the original image and the new histogram.
   a. The cumulative probability of the new PDF is calculated by the computing unit $$v_l = G(z_l) = \sum_{i=0}^{l} p_z(z_i) \, (l = 0 \sim L-1)$$

b. For each given $s_k$, the value of l being iteratively increased, in each step by one (1), the $v_l$ which makes the absolute value of the difference between $v_l$ and $s_k$ reaches its minimum is calculated and its value with the values of the corresponding k and l is stored:

$$|v_l - s_k|_{min}$$

c. The values of the corresponding $z_l$ and $r_k$ is calculated:

$$z_l = G^{-1}(v_l)$$

$$r_k = T^{-1}(s_k)$$

d. r is mapped to z and the correlation is stored in a specific memory:

$$z_l = z(r_k)$$

e. The above correlation stored in the specific memory is used by the computing device to process the histogram of the original image.

Exemplary Embodiment 2

Figure 6:
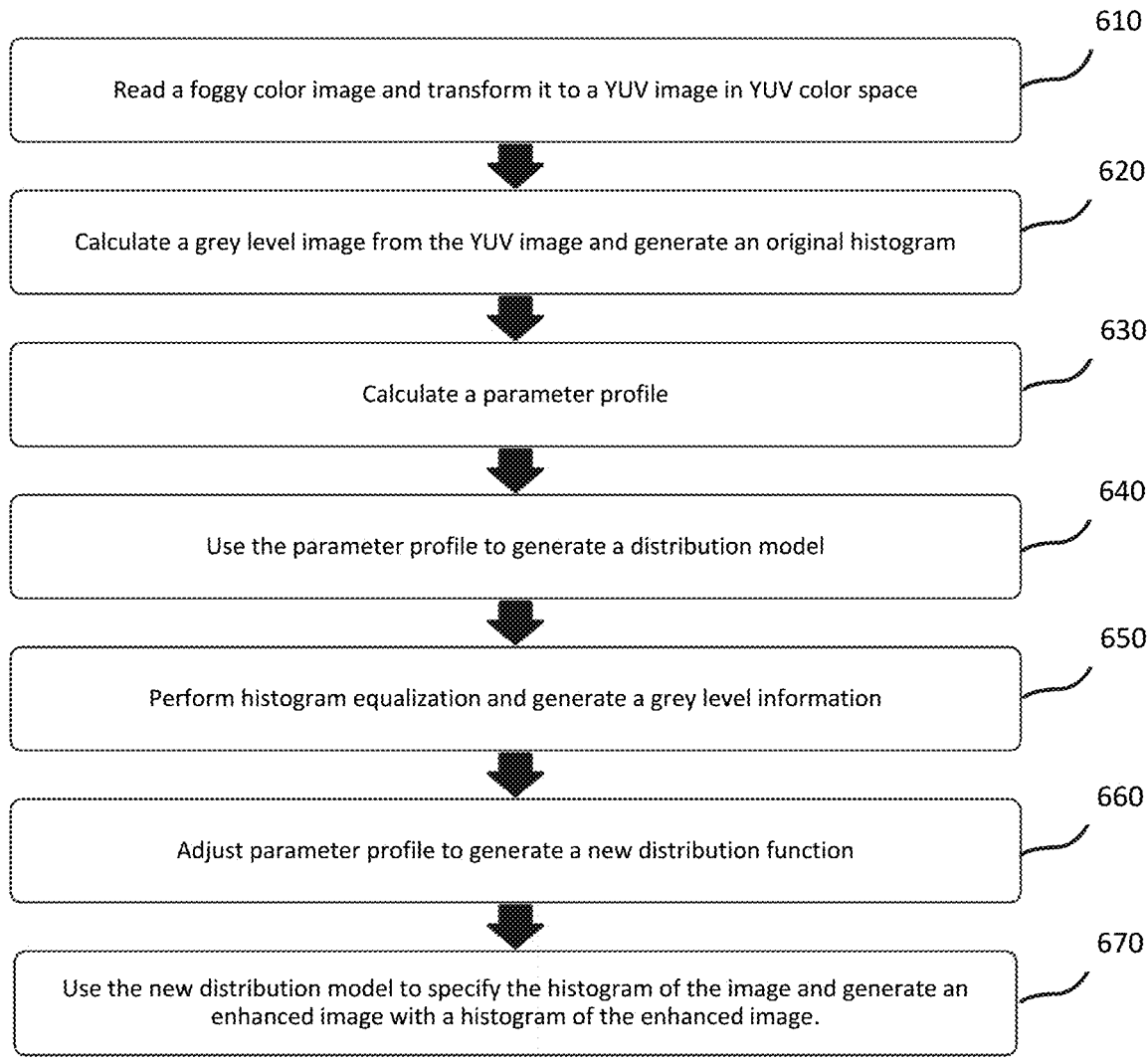
FIG. 6 is a flowchart illustrating operation of an image enhancement method for a foggy color image according to one embodiment.
Figure 7:
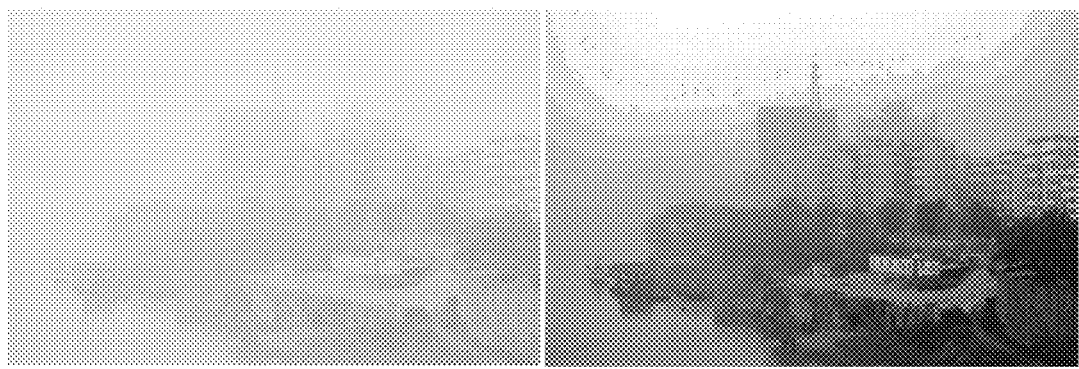
FIG. 7 is an example illustrating an original grayscale image and its defogged version after the defogging processing according to one embodiment.
Figure 8:
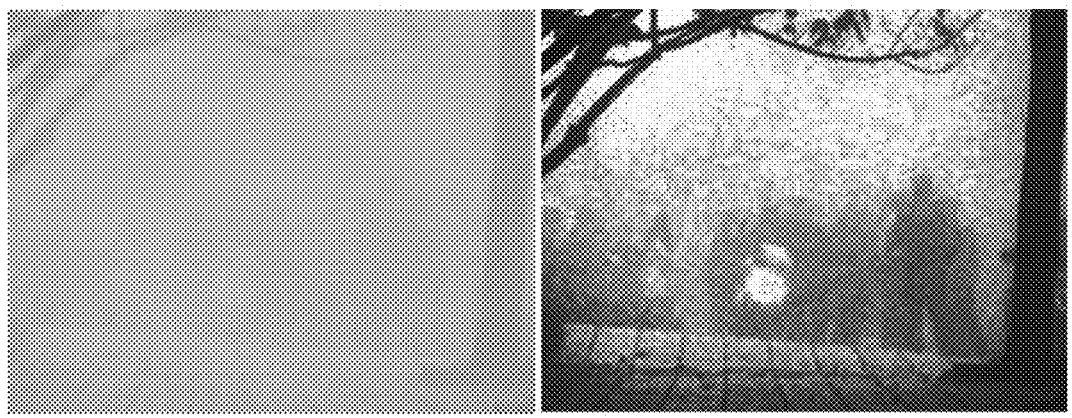
FIG. 8 is an example illustrating an original color image and its defogged version after the defogging processing according to one embodiment.

In this embodiment of the invention, an image processing workflow for a color image is shown. A color image contains color information, besides its luminance information. When dealing with a color image, it is convenient to process the luminance component, say Y in the YUV format, while keeping the other components fixed. Referring to FIG. 6, detailed steps are listed as follows:
1. An original image which is in an RGB color space is loaded into and then stored in an input unit in an image processing device, the original image is subsequently converted from the RGB color space to a first YUV image with a first Y fraction, a first U fraction and a first V fraction in a YUV color space by a conversion unit, the first Y fraction is treated as a first grayscale image, the first grey level value profile for the first grayscale image is read using scanning or other techniques, and hence a first histogram of the first grayscale image is generated;
2. A parameter set comprising three initial parameters, A, B, C, is generated according to the following equations:

$$A = \sum_{r=0}^{L-1} r p_r(r) = \sum_{r=0}^{L-1} r \frac{n_r}{n}$$

$$B = \sum_{\delta=0}^{L} \delta^2 p_\delta$$

$$C = \sqrt{A^2 - B^2}$$

Where $\delta$ is the difference in the intensity level between neighboring pixels, and $p_\delta$ is the probability distribution of the intensity difference $\delta$.

3. The three parameters A, B, C, as the expectation ($E_x$), entropy ($E_n$), hyper entropy ($H_E$), respectively, is used by a computing unit in the image processing device to generate a distribution function;
   a. A normally distributed random number $y_i$ with expectation $E_n$ and variance $H_E$ is generated by a random number generator which may comprise of a buffer for storage of intermediate values;

$y_i = R_N(E_r, H_E)$ b. A normally distributed random number $x_i$ with expectation $E_x$ and variance $y_i$ is generated by a random number generator;

$x_i = R_N(E_x, y_i)$ c. Steps a and b are repeated until n cloud drops are generated.

4. The following equation is used to equalize the histogram of the first grayscale image and the correlation between $s_k$ and $r_k$ is derived:

$$s_k = T(r_k) = \sum_{r=0}^{k} p_r(r) = \sum_{r=0}^{k} \frac{n_r}{n} (r, k = 0 \sim L-1)$$

5. The values of the three parameter A, B and C are changed, thereafter a new cloud, i.e., a new probability distribution function (PDF) is generated;

6. The new PDF is used to specify the first histogram of the first grayscale image, then a second histogram is generated and, as a consequence, a second grayscale image according to the first grayscale image and the second histogram is generated.

a. The cumulative probability is calculated by the computing unit $$v_l = G(z_l) = \sum_{i=0}^{l} p_z(z_i) \, (l = 0 \sim L-1)$$

b. For each given $s_k$, the value of l being iteratively increased, in each step by one (1), the minimal $v_l$ satisfying the following inequality is calculated and its value with the values of the corresponding k and l is stored:

$v_l - s_k \geq 0 (l, k = 0 \sim L-1)$ c. The values of the corresponding $z_l$ and $r_k$ are calculated as:

$z_l = G^{-1}(v_l)$ $r_k = T^{-1}(s_k)$ d. r is mapped to z and the correlation is stored in a memory:

$z_l = z(r_k)$ e. The above correlation is stored in the memory to process the histogram of the first grayscale image to generate the second histogram and the second grayscale image.

7. The second grayscale image is used as a second Y fraction and combined with the first U fraction and the first V fraction to generate a second YUV image. The second YUV image in the YUV color space is converted by the conversion unit to an enhanced image in the RGB color space.

The image processing device may further comprise a display unit such as a LCD display or LED display to display the original and processed image for the sake of comparison.

Herein the image processing device, along with the detailed steps of the image processing is presented. Alternatively, a suitably programmed digital signal processor for image processing or general purpose computer processor equipped with some essential components such as several kinds of processors (CPUs or GPUs) or several buffer storages can be used to implement the method given a specific software to execute image enhancement. Such a software implementation of the invention may be appropriate for image enhancement software in a personal computer, or embedded in the image processing module in a digital camera or a mobile phone. It may also be suitable for embedded implementation in image capturing devices such as compact digital cameras, digital single reflex cameras (dSLRs), or camera-phones such as feature phones or smart phones with imaging components, which generally include a general purpose microprocessor or a digital signal processor.

The steps of the method described herein can be implemented in any suitable order or simultaneously in appropriate circumstances. In addition, individual steps can be deleted from any method without departing from the spirit and scope of the subject matter described herein. Various aspects of any example described above can be combined with various aspects of any example in other examples described, so as to constitute a further example without losing the effect sought.

The foregoing descriptions are merely particular examples of the present invention, and should not be regarded as the only embodiments. Apparently, one skilled in the art, after reading and understanding the content and principles of the present invention, may make various modifications and variations to forms and details without departing from the principles and structure of the present invention, while the modifications and variations still fall within the scope of the claims of the present invention.

What is claimed is:

1. A method for image processing, which comprises the following steps:
    generating a first histogram from a first image;
    using a cloud generator to perform a histogram specification to the first histogram of the first image to generate a second histogram, the cloud generator comprising multiple random number generators (RNGs) and multiple buffers, the RNGs generating intermediate random variables with Gaussian distribution, and the multiple buffers storing the intermediate random values generated by the RNGs; and
    generating a second image based on the first image and the second histogram.

2. The method of claim 1, wherein the using the cloud generator to perform a histogram specification to the first histogram of the first image to generate a second histogram further includes:
    calculating a first parameter profile based on the first image;
    generating a first statistical distribution based on the first parameter profile;
    using the first distribution to perform the histogram specification to the first histogram of the first image;
    generating a second parameter profile by adjusting the first parameter profile;
    using the second parameter profile as an input to the cloud generator to generate a second statistical distribution; and
    generating a second histogram based on the second statistical distribution.

3. The method of claim 2, wherein the calculating the first parameter profile based on the first image is provided by the inverse cloud generator.

4. The method of claim 2, the calculating the first parameter profile based on the first image further comprises:
reading the first image and storing intensity information for each pixel of the first image; and
calculating the first parameter profile according to the stored intensity information.

5. The method of claim 4, wherein the intensity information includes at least one of RGB values in a RGB format image, Y—component values in a YUV format image, or grey level values in a grayscale image.

6. The method of claim 2, wherein the parameter profile includes at least one of an average luminance of the first image, brightness of the first image, or a contrast of the first image.

7. The method of claim 2, wherein generating the first statistical distribution based on the first parameter profile further comprises:
transferring the first parameter profile to the cloud generator; and
generating the first statistical distribution via the cloud generator mapping at least three parameters selected from the first parameter profile.

8. The method of claim 7, wherein the at least three parameters selected from the first parameter profile comprise expectation, entropy and hyper entropy.

9. The method of claim 2, wherein the generating the second parameter profile by adjusting the first parameter profile with an iterative algorithm.

10. An image processing system comprising:
a computing unit, adapted to:
generate a first histogram from a first image;
use a cloud generator to perform a histogram specification to the first histogram of the first image to generate a second histogram, the cloud generator comprising multiple random number generators (RNGs) and multiple buffers, the RNGs generating intermediate random variables with Gaussian distribution, and the multiple buffers storing the intermediate random values generated by the RNGs; and
generate a second image based on the first image and the second histogram.

11. The system of claim 10, the image processing system further comprising an adjustment unit, to use the cloud generator to perform a histogram specification to the first histogram of the first image to generate a second histogram, the computing unit is adapted to:

calculate a first parameter profile based on the first image;
generate a first statistical distribution based on the first parameter profile;
use the first distribution to perform the histogram specification to the first histogram of the first image;
generate a second parameter profile by adjusting the first parameter profile via the adjustment unit;
use the second parameter profile as an input to the cloud generator to generate a second statistical distribution; and
generate a second histogram based on the second statistical distribution.

12. The system of claim 11, to calculate the first parameter profile based on the first image, the computing unit is adapted to use the inverse cloud generator.

13. The system of claim 11, the image processing system further comprising an input unit, to calculate the first parameter profile based on the first image, the input unit is adapted to read the first image and storing intensity information for each pixel of the first image; and
the computing unit is adapted to calculate the first parameter profile according to the stored intensity information.

14. The system of claim 13, wherein the intensity information includes at least one of RGB values in a RGB format image, Y—component values in a YUV format image, or grey level values in a grayscale image.

15. The system of claim 11, wherein the parameter profile includes at least one of an average luminance of the first image, brightness of the first image, or a contrast of the first image.

16. The system of claim 11, to generate the first statistical distribution based on the first parameter profile, the computing unit is adapted to:
transfer the first parameter profile to the cloud generator; and
generate the first statistical distribution via the cloud generator mapping at least three parameters selected from the first parameter profile.

17. The method of claim 16, wherein the at least three parameters selected from the first parameter profile comprise expectation, entropy and hyper entropy.

18. The method of claim 11, to generate the second parameter profile by adjusting the first parameter profile, the computing unit is adapted to use an iterative algorithm.

* * * * *